United States Patent
Lach et al.

(10) Patent No.: US 10,605,194 B2
(45) Date of Patent: Mar. 31, 2020

(54) CYLINDER BORE WITH SURFACE CHARACTERISTICS FOR IMPROVED TRIBOLOGICAL PROPERTIES, AND METHOD

(71) Applicant: Ford Global Technologies, LLC, Dearborn, MI (US)

(72) Inventors: Rainer Lach, Wuerselen (DE); Franz Weber, Walldorf (DE); Guenter Hans Grosch, Vettweis (DE)

(73) Assignee: Ford Global Technologies, LLC, Dearborn, MI (US)

(*) Notice: Subject to any disclaimer, the term of this patent is extended or adjusted under 35 U.S.C. 154(b) by 261 days.

(21) Appl. No.: 15/718,975

(22) Filed: Sep. 28, 2017

(65) Prior Publication Data

US 2018/0087468 A1   Mar. 29, 2018

(30) Foreign Application Priority Data

Sep. 28, 2016   (DE) .......................... 10 2016 218 686

(51) Int. Cl.
*F02F 1/20*   (2006.01)
*F16J 10/04*   (2006.01)

(52) U.S. Cl.
CPC ................. *F02F 1/20* (2013.01); *F16J 10/04* (2013.01)

(58) Field of Classification Search
CPC ..................................... F02F 1/20; F16J 10/24
See application file for complete search history.

(56) References Cited

U.S. PATENT DOCUMENTS

| | | | |
|---|---|---|---|
| 5,701,861 A | 12/1997 | Hegemier et al. | |
| 2004/0226402 A1* | 11/2004 | Fuchs | C25D 5/02 74/828 |
| 2016/0053710 A1* | 2/2016 | Donahue | F02F 1/004 123/668 |

FOREIGN PATENT DOCUMENTS

| DE | 102015219702 A1 | 4/2017 |
|---|---|---|
| WO | 2015192943 A1 | 12/2015 |

* cited by examiner

*Primary Examiner* — Kevin A Lathers
(74) *Attorney, Agent, or Firm* — Geoffrey Brumbaugh; McCoy Russell LLP (57) ABSTRACT

The invention relates to a cylinder bore and a method. The cylinder bore is configured to receive a piston for reciprocating movement therein and has a pressure side and a counter-pressure side. The cylinder bore includes a bore surface having a first roughness value in a first longitudinal region on the pressure side and a second roughness value different from the first roughness value in the first longitudinal region on the counter-pressure side.

14 Claims, 5 Drawing Sheets

CYLINDER BORE WITH SURFACE CHARACTERISTICS FOR IMPROVED TRIBOLOGICAL PROPERTIES, AND METHOD

CROSS REFERENCE TO RELATED APPLICATION

The present application claims priority to German Patent Application No. 102016218686.8, filed Sep. 28, 2016. The entire contents of the above-referenced application are hereby incorporated by reference in its entirety for all purposes.

FIELD

The present disclosure relates to improvements in, or relating to, lubricating surfaces relatively movable within a cylinder bore of an internal combustion engine, and in particular to surface treatment for improved lubrication.

BACKGROUND/SUMMARY

The surface of a cylinder bore may be end-processed by means of, for example, a honing method. Description of the resultant surfaces may include roughness values from one or more roughness standards. For example roughness values Rpk, Rk and Rvk, are disclosed in DIN 4776. Other standards may be used.

A low roughness value may shorten the run-in time of the internal combustion engine, and may reduce the oil consumption and may reduce the emissions as a result of burnt oil. The friction between the piston or the piston rings thereof and the bore surface, which may be referred to as the slide way, may also be reduced, which can have a positive effect on the fuel consumption, and consequently on the $CO_2$ emissions.

The roughness values Rpk and Rk may be as low as possible, wherein the roughness value Rvk is selected so as to be dependent on the resistance stability and consequently the robustness and reliability of the internal combustion engine. This means that the roughness value Rvk may be mainly responsible for the quantity of the oil retained in the indentations in order to lubricate this tribological system adequately. The magnitude of the Rvk value should consider and ensure the behavior of the contact surfaces over the entire service-life of the internal combustion engine so that a precise function is provided over the entire service-life.

Therefore, current internal combustion engines may have at the bore surface thereof by way of example the following roughness values: Rpk=0.0-0.35 µm/Rk=0.2-0.9 µm/Rvk=0.8-2.3 µm. These values are typically intended to be identical over the entire bore surface.

However, it has been found that during a piston stoppage, that is to say, in the top and bottom dead center, the hydrodynamic behavior is cancelled and a mixed friction occurs. Therefore, there are known attempts to vary the roughness value over the bore surface. A higher roughness value Rvk may be provided at the top and bottom dead center portion than in an intermediate portion arranged therebetween. This may cause a higher oil storage in the rougher surface so that the mixed friction and therefore the wear may be reduced. In the intermediate portion in which the piston has the greatest relative speed with respect to the bore surface, however, the roughness value Rvk may be reduced as a result of the hydrodynamic behavior.

For example, DE 695 05 467 T2 discloses a cylinder having different surface states, wherein the cylinder bore surface has been honed. The cylinder bore surface of DE 695 05 467 T2 has, when viewed in a vertical direction, three different portions, of which only one is finely honed. An upper portion, that is to say, a top dead center portion, and a lower portion, that is to say, a bottom dead center portion of the cylinder bore surface, is coarsely honed, respectively. A center portion which is arranged therebetween is finely honed. The deep indentations of the coarsely honed surfaces obtained allow lubricant to be retained therein, whereby the wear is reduced. On the smoothly honed center portion at which the piston speed is relatively high relative to the cylinder bore surface, a hydrodynamic lubrication is provided.

The inventors herein have recognized a number of shortcomings with this approach. For example, the level of roughness on counter-pressure side at the upper and lower ends of the bore may be greater than necessary. These areas may tend to adversely affect the overall smooth movement of the piston. The present disclosure may provide a cylinder bore configured to receive a piston for reciprocating movement therein. The cylinder bore may have a pressure side and a counter-pressure side, and may include a bore surface having a first roughness value in a first longitudinal region on the pressure side, and a second roughness value different from the first roughness value in the first longitudinal region on the counter-pressure side. In this way, the cylinder bore may have improved tribological properties.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Embodiments may set out a cylinder bore which has a bore surface, in which a piston can be moved back and forth, wherein the piston may have a pressure side and a counter-pressure side which may be spaced apart therefrom in a peripheral direction. The pressure side may be preferably arranged opposite the counter-pressure side. In various embodiments the bore surface may have different roughness values at the surface regions thereof which may be directed toward the pressure side and the counter-pressure side.

The kinematics of the crank mechanism of an internal combustion engine may lead to multiple abutment changes of the piston against the bore surface. The shaft face of the piston may be referred to as the pressure side, which shaft face moves into abutment under the combustion pressure after the top dead center with the cylinder wall, that is to say, the bore surface. The side which is spaced apart therefrom in a peripheral direction, in particular the opposite side, may be referred to as the counter-pressure side. The pressure side may be loaded more powerfully during the working cycle than the counter-pressure side. The value Rvk may be preferably intended to be understood to be the roughness value.

Therefore, it may be advantageous according to the present disclosure if the surface region, which is directed toward the pressure side, may have a greater roughness value than the surface region of the bore surface directed toward the counter-pressure side. In an exemplary embodiment, the roughness Rvk at the counter-pressure side may be smooth, wherein the roughness Rvk at the pressure side may be rough.

In accordance with the present disclosure the roughness value over the bore surface, that is to say, when viewed in a longitudinal, for example a vertical, direction, may be different at the surface region which may be orientated toward the pressure side and at the surface region which may be orientated toward the counter-pressure side. Therefore, it may be advantageously provided that the bore surface may have, at the surface region directed toward the pressure side, a different roughness in the region of the top dead center of the piston from that in the region of the bottom dead center. It may also be advantageous if the bore surface has, at the surface region directed toward the counter-pressure side in the region of the upper dead center of the piston, a different roughness from that in the region of the bottom dead center. There may be provision for the surface region which is directed toward the pressure side to be rougher in the region of the top dead center than the surface region directed toward the pressure side in the region of the bottom dead center. It may also be provided that the surface region directed toward the counter-pressure side be rougher in the region of the top dead center than the surface region directed toward the counter-pressure side in the region of the bottom dead center.

There may be arranged between the top and bottom dead center region an intermediate region, which may have a different roughness value with respect to the surface region of the top and bottom dead center.

In some cases it may be advantageous if the intermediate region is divided into three portions. In this case, there may be provided an upper transition region which may directly adjoin the top dead center region in the direction toward the bottom dead center region. A central region may adjoin the upper transition region and a lower transition region. The bottom dead center region may adjoins the lower transition region. In this way, account may be taken of the different relative speeds of the piston in relation to the bore surface. In the central region, the piston may have the greatest speed. In the transition regions, the speed may increase or decrease depending on the direction in which the piston is moving. If the piston is moving in the direction toward the top dead center region or bottom dead center region, the speed may continuously decrease. If the piston is moving from the top dead center region or bottom dead center region in the direction toward the central region, the speed may continuously increase. Ideally, the same relative speed may apply in the transition regions, for example, at notional lines within the regions. In the top and bottom dead center region, the speed may decrease in the direction toward the top or bottom dead center continuously as far as zero and then may increase again continuously if the piston is moved in a manner orientated away from the top and bottom dead center.

In accordance with the present disclosure, the different kinematic conditions in the regions mentioned may be taken into account by a greater roughness value being provided at the surface region of the bore surface directed toward the pressure side in the upper transition region than in the central portion and in the lower transition region, wherein the surface region in the top dead center region may be rougher than in the bottom dead center region. At the surface region of the bore surface directed toward the counter-pressure side, a greater roughness value Rvk may also be provided in the upper transition region than in the central portion and in the lower transition region, wherein the surface region in the top dead center region may also be rougher than in the lower dead center region.

In the central portion and in the lower transition region, there may be provided at the surface region of the cylinder bore directed toward the pressure side, that is to say, the bore surface, a similar, or substantially identical, roughness value which may be lower than in the bottom dead center region. In the central portion and in the lower transition region, there may be provided at the surface region of the cylinder bore directed toward the counter-pressure side, that is to say, the bore surface, a similar, or substantially identical, roughness value which may be lower than in the bottom dead center region.

Intermediate sectors may have different roughness values with respect to the roughness values in the top and bottom dead center region and may be arranged between the surface region which may be directed toward the pressure side and the surface region which may be directed toward the counter-pressure side, respectively. The roughness values in the intermediate sectors may be advantageously lower than in the surface region directed toward the pressure side and the counter-pressure side, respectively. Thus, the cylinder bore may be quasi divided into quadrants, of which one quadrant may represent the surface region of the pressure side, and another quadrant opposite thereto may represent the surface region of the counter-pressure side. The quadrants arranged therebetween may represent the surface region which may be referred to as the piston boss region.

If the cylinder bore is subdivided into the above-mentioned portions, the surface region directed toward the pressure side may have, in the respective portions, a greater roughness value than the relevant surface regions in the intermediate sectors. The surface region directed toward the counter-pressure side in the relevant portions similarly may have a greater roughness than in the relevant surface regions of the intermediate sectors. However, there may be provision for the roughness values of the surface regions to be similar, or substantially identical in the central portion and the lower transition portion both at the surface region directed toward the counter-pressure side and in the intermediate sectors, wherein the relevant surface regions of the pressure side may be rougher.

Thus, there may be provided with the present disclosure a cylinder bore, in which the piston speed, but also the lateral forces, may be taken into account in order to adjust the varying roughness at the bore surface with respect to the position in a peripheral direction and the position in a vertical direction.

A higher roughness value Rvk may be provided inside the surface regions in which high lateral forces (pressure side, counter-pressure side) may be applicable, wherein a smoother bore surface may be provided, however, at the same side in the lower region (bottom dead center region).

In accordance with the present disclosure, a different roughness may be provided in a peripheral direction of the cylinder bore. Furthermore, a variable surface roughness in a vertical direction may additionally be provided. Thus, a bore surface with an advantageous roughness distribution may be achieved. In this way, the roughness adjustment may a function of the piston speed and the applied lateral forces.

The following equations from conventional crank drive kinematics may be used to illustrate, and/or describe travel, speed and lateral forces of a piston traveling in a cylinder bore including states of non-movement at top dead center a bottom dead center positions. The present disclosure may provide improved oil storage in locations in the cylinder in cases of high lateral forces, and bore smoothness and effective lubrication during piston movement.

Piston travel $(TDC\alpha = 0°) s(\alpha) =$  Equation 1
$$r \cdot \left(1 - \cos(\alpha) + \frac{1}{\lambda} - \frac{1}{\lambda} \cdot \sqrt{1 - \lambda^2 \cdot \sin^2(\alpha)}\right)$$

Piston speed $(TDC\alpha = 0°) \dot{s}(\alpha) =$  Equation 2
$$r \cdot \omega \cdot \left(\sin(\alpha) + \frac{\lambda \cdot \sin(\alpha) \cdot \cos(\alpha)}{\sqrt{1 - \lambda^2 \cdot \sin^2(\alpha)}}\right)$$

Lateral force of piston $F_s(\alpha) = F_z \cdot \left(\dfrac{\lambda \cdot \sin(\alpha)}{\sqrt{1 - \lambda^2 \cdot \sin^2(\alpha)}}\right)$  Equation 3

In this regard, the surface roughness Rvk may be a function of the three terms, where λ is the quotient of r/l, with r being the crank radius and l being the connecting rod length. ω is the magnitude of the angular speed of the crankshaft.

On the basis of the following equations, the surface roughness over the cylinder bore height can be specified for crank drive kinematics with a crankshaft offset:

Piston travel $(TDC\alpha = 0°) s(\alpha) =$  Equation 4
$$r \cdot \left(1 - \cos(\alpha) - \frac{1}{\lambda} \cdot \sqrt{1 - \lambda^2 \cdot \sin^2(\alpha) + 2 \cdot \lambda \cdot \mu \cdot \sin(\alpha) - \mu^2} + \frac{1}{\lambda} \cdot \sqrt{1 - \mu^2}\right)$$

Piston speed $(TDC\alpha = 0°) \dot{s}(\alpha) =$  Equation 5
$$r \cdot \omega \cdot \left(\sin(\alpha) + \frac{\lambda \cdot \sin(\alpha) \cdot \cos(\alpha) - \mu \cdot \cos(\alpha)}{\sqrt{1 - \lambda^2 \cdot \sin^2(\alpha) + 2 \cdot \lambda \cdot \mu \cdot \sin(\alpha) - \mu^2}}\right)$$

Lateral force of piston $F_s(\alpha) =$  Equation 6
$$F_z \cdot \left(\frac{\lambda \cdot \sin(\alpha) - \mu}{\sqrt{1 - \lambda^2 \cdot \sin^2(\alpha) + 2 \cdot \lambda \cdot \mu \cdot \sin(\alpha) - \mu^2}}\right)$$

In this regard, the surface roughness Rvk may also be a function of the three terms, where λ is the quotient of r/l, with r being the crank radius and l being the connecting rod length. ω is the magnitude of the angular speed of the crankshaft. μ is the quotient of a/l, with a being the crankshaft offset and l the connecting rod length. Fz is the resultant vertical piston force based on gravitational forces and gas forces.

High lateral piston forces may require a thicker oil film, in particular in regions with a low piston speed, so that the roughness value Rvk may be increased here according to the disclosure. In this way, the oil storage capacity of the bore surface may be increase. Also in this way, wear and friction may be reduced. Smaller lateral piston forces, in particular in regions of high piston speeds, however, may allow a smoother bore surface so that the Rvk roughness value according to the invention may be reduced in order to avoid wear and to use the advantages with respect to the friction.

The present disclosure may also relate to a method for producing an above-mentioned cylinder bore. In this case, the cylinder bore may be initially produced in known manner, wherein a honing method may be used for the end-processing. Other suitable end-processing methods may also be used. There may be provided in accordance with the disclosure for the bore surface to be produced at a surface region directed toward the pressure side so as to have a roughness value which is different from a roughness value at the surface region directed toward the counter-pressure side.

Also in accordance with the disclosure, the surface region directed toward the pressure side may be produced so as to have a greater roughness value than the surface region of the bore surface directed toward the counter-pressure side. In a preferred embodiment, the roughness Rvk at the counter-pressure side may be smooth, wherein the roughness Rvk at the pressure side may be rough.

In another possible embodiment, the bore surface may be produced, when viewed in a peripheral direction, so as to have different roughnesses. The surface region directed toward the pressure side may be produced so as to have a greater roughness value than the surface region of the bore surface directed toward the counter-pressure side, and the respective surface region may be produced in intermediate sectors so as to have a roughness value which may be further reduced in comparison.

In some cases, the bore surface may be produced so as to have variable roughness values not only in the peripheral direction but also in a vertical direction. To this end, the cylinder bore may be subdivided along the vertical axis thereof into successive portions, in which variable roughness values may be produced in accordance with the surface region.

Figure 1:
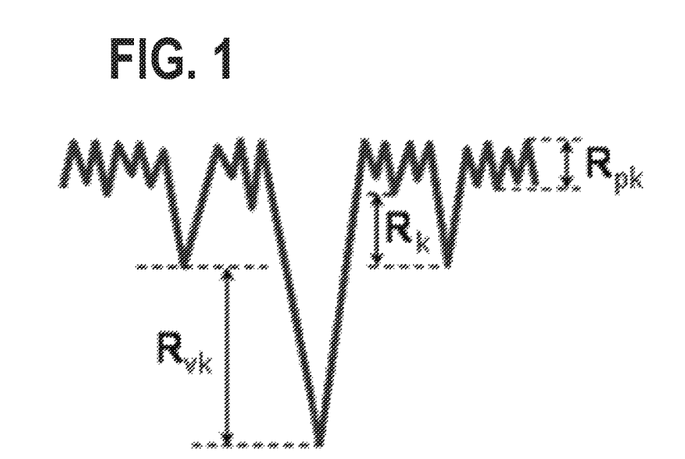
FIG. 1 is a roughness diagram in accordance with example roughness standard DIN 4776.
Figure 2:
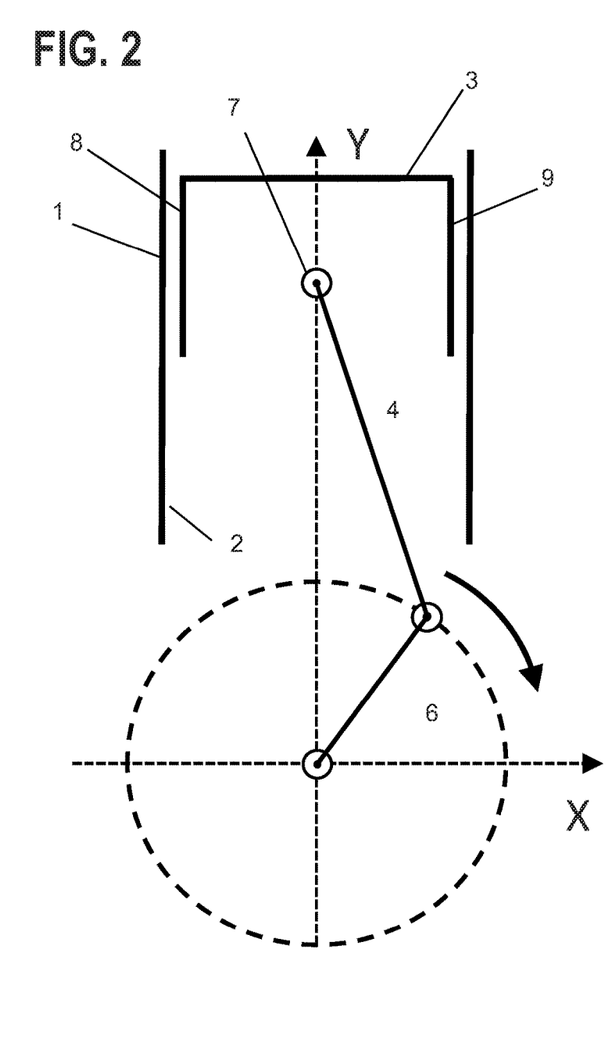
FIG. 2 is a schematic side view of a cylinder bore in which a piston may be disposed for reciprocating movement therein and which may be moved back and forth.
Figure 3:
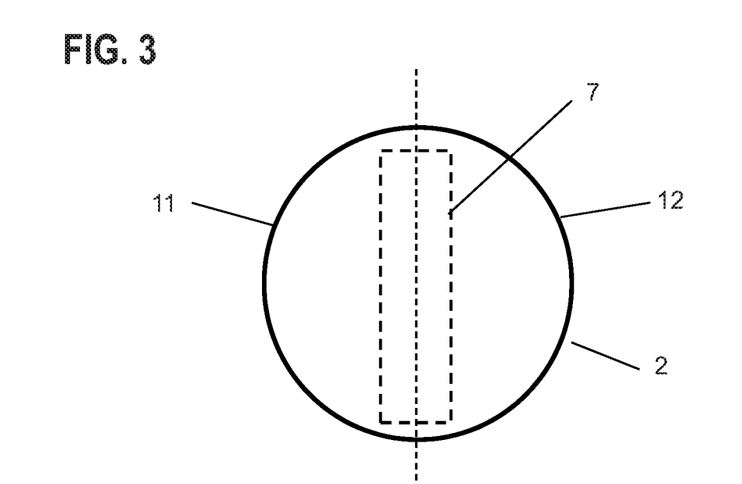
FIG. 3 is a top view of the cylinder bore from FIG. 1.

FIG. 2 is a schematic side view of an example cylinder bore 1 which has a bore surface 2 in accordance with the disclosure. A piston 3 can be moved back and forth in the cylinder bore 1. The piston 3 may be connected via a connecting rod 4 to a crankshaft 6 which is illustrated with broken lines. The connecting rod 4 may be secured to the piston 3 by means of a bolt 7 (FIG. 3). Piston rings are not illustrated. The crankshaft 6 may rotate in a clockwise direction by way of example, which is indicated by means of the rotation arrow.

The piston 3 has a pressure side 8 and a counter-pressure side 9 which are spaced apart from each other when viewed in a peripheral direction. In the embodiment illustrated, the pressure side 8 is illustrated on the left side of the plane of the drawing, wherein the counter-pressure side 9 is arranged opposite it (FIG. 2).

The cylinder bore 1 may be a component of an internal combustion engine, that is to say, of a reciprocating piston engine, which may have one, two, or a plurality of cylinder bores.

The bore surface 2 may have a surface region 11 which may be directed toward the pressure side 8 and a surface region 12 which may be directed toward the counter-pressure side 9 (FIG. 3), wherein the roughness, for example, the roughness value Rvk at the mentioned surface regions 11 and 12, may be different in each case. In a preferred embodiment, the surface region 11 which is directed toward the pressure side 8 may have a greater roughness than the opposing surface region 12 which is orientated toward the counter-pressure side 9. FIG. 3 illustrates the piston bolt 7, wherein the piston has been omitted.

Figure 4:
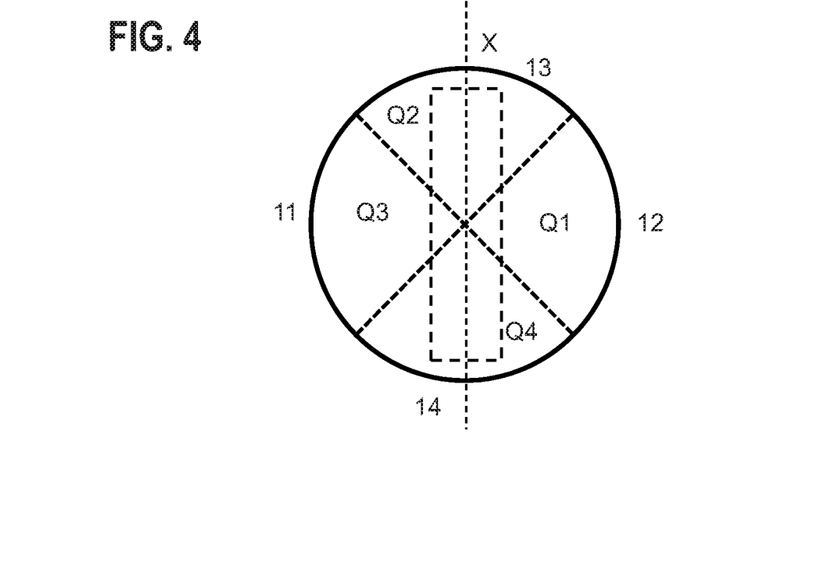
FIG. 4 is a top view of the cylinder bore from FIG. 1, in a state divided into quadrants.

The top view according to FIG. 4 shows that the cylinder bore 1 may be divided into four quadrants Q1 to Q4 by way of example. The quadrant Q1 is intended to represent the surface region 12 which may be orientated toward the counter-pressure side 9. The quadrant Q3 accordingly represents the surface region 11 which may be orientated toward the pressure side 8. In the embodiment according to FIG. 3, no quadrants are provided so that the surface regions 11 and 12 are greater at that location than in the embodiment according to FIG. 4. In this regard, there is produced a more variable production method for the cylinder bore 1 with respect to the possible different roughness values in the quadrants Q1 to Q4. The quadrants Q2 to Q4 represent the surface regions 13, 14 which are arranged as intermediate sectors between the surface regions 11 and 12. The piston bolt axis X is also located in the plane of the intermediate sectors, as can be seen in FIG. 4.

There is provision by way of example for the surface regions 11 to 14 of the respective quadrants to have variable roughnesses. Thus, it may be provided that for the surface region 11, which is orientated toward the pressure side 8, to have a greater roughness than the opposing surface region 12 which is directed toward the counter-pressure side 9. The surface regions 13, 14 in the intermediate sectors Q2 and Q4 may have a roughness which may be lower in comparison.

By way of example, there may be provided in the quadrant Q1, that is to say, in the surface region 12 which is directed toward the counter-pressure side 9, a roughness Rvk which can be referred to as smooth. In the quadrant Q3, that is to say, in the surface region 11 which is directed toward the pressure side 8, there may be provided a roughness Rvk which can be referred to as rough. In the surface regions of the intermediate sectors Q2 and Q4, there can be provided a roughness Rvk which can be referred to as very smooth. The following roughness values Rvk can be used by way of example to describe very smooth, smooth, rough and very rough.

very smooth: $0.8\ \mu m \leq Rvk \leq 1.2\ \mu m$
smooth: $1.2\ \mu m \leq Rvk \leq 1.6\ \mu m$
rough: $1.6\ \mu m \leq Rvk \leq 2.0\ \mu m$
very rough: $2.0\ \mu m \leq Rvk < 2.4\ \mu m$ In another possible embodiment of the invention, the bore surface 2 may have a variable surface roughness both when viewed in a peripheral direction and when seen in a vertical direction of the cylinder bore 1. This is schematically illustrated by way of example in FIGS. 5-6.

Figures 5, 6:
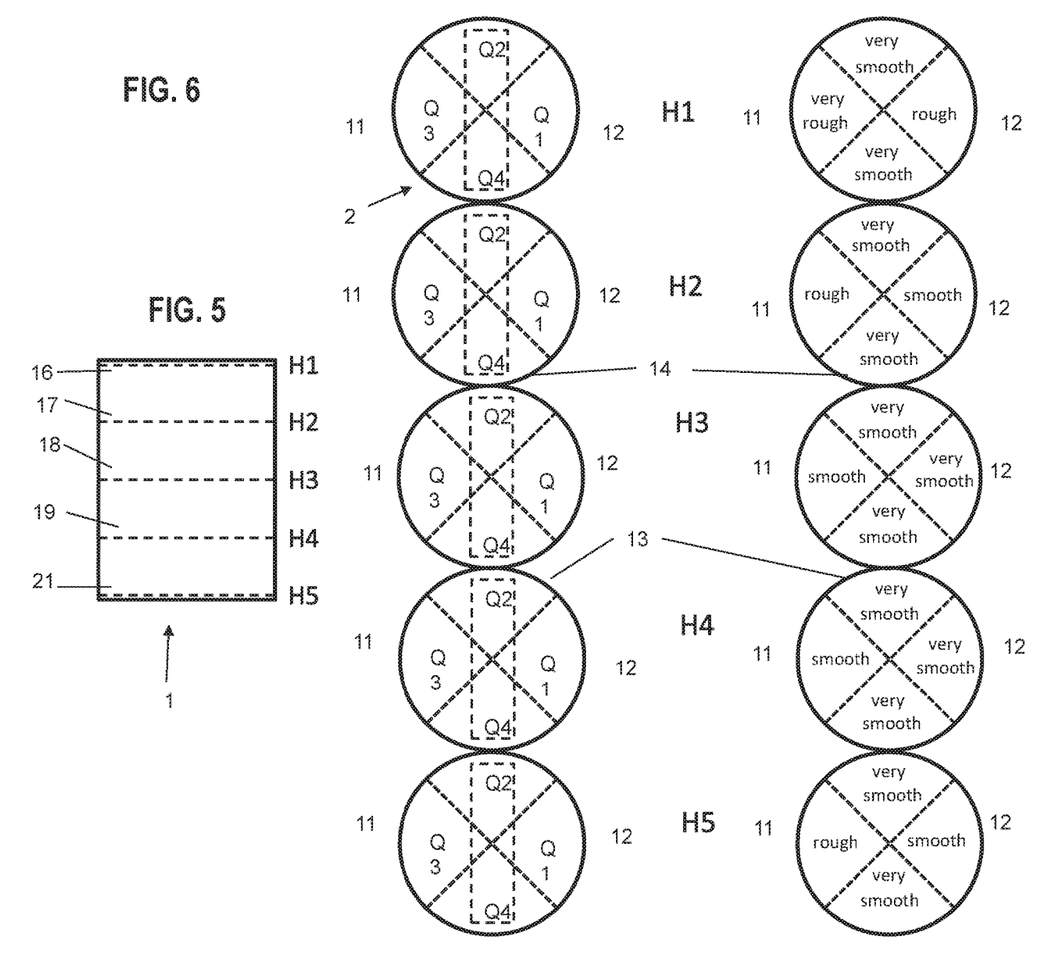
FIG. 5 is a cross-section through the cylinder bore from FIG. 1, in a state divided into portions in the vertical direction of the cylinder bore.
FIG. 6 is a top view of the cylinder bore, in a state divided into quadrants for each of the portions from FIG. 5.

The cylinder bore 1 may be divided into five portions 16, 17, 18, 19 and 21 when seen in a vertical direction. By way of example, there are arranged in the respective portion lines H1 to H5, at which the piston 3 may have, essentially, an identical relative speed with respect to the relevant bore surface of the cylinder bore. At the line H1, the piston 3 is located at the top dead center and has a speed of zero. Here, the piston 3 is located in the top dead center region 16 and moves in the direction toward the adjacent upper transition region 17, and may be accelerated in terms of its speed. At the line H2, the piston may have a specific speed. The piston 3 may be further moved and reach the central region 18 which may adjoin the upper transition region 17. At the line H3, the piston may have a specific speed, wherein the speed may be greatest in the central region 18. The piston 3 may be moved further and may reach the lower transition region 19 which may adjoin the central region 18. At the line H4, the piston may have a specific speed. The piston 3 may be moved further and may reach the bottom dead center region 21 which may adjoin the lower transition region 19. At the line H5, the piston may have the speed zero. In this regard, the piston 3 in the region of the lower transition region 19 can already be reduced in terms of the speed thereof, wherein it is continuously reduced as far as the bottom dead center to zero. If the piston 3 moves from the bottom dead center region 21 in the direction toward the top dead center region 16, the speed may be similarly initially increasing in order then to decrease once more. At the notional lines H1 to H5, the identical speed is present, wherein the movement direction of the piston 3 is alternating in a different manner.

In view of these different kinematic states, the bore surface 2 may have, in the respective portions 16 to 21, different roughnesses in the four quadrants Q1 to Q4.

At the line H1, that is to say, in the top dead center region 16, the surface region 11 which is directed toward the pressure side 8 (quadrant Q3) may have a roughness value which can be referred to as very rough. In the quadrant Q1, the surface region 12 which is directed toward the counter-pressure side 9 may have a lower roughness which can be referred to as rough. The surface regions 13 and 14 in the quadrant Q1 and Q4 may also have a lower roughness which can be referred to as very smooth.

At the line H2, that is to say, in the upper transition region 17, the surface region 11 which is directed toward the pressure side 8 (quadrant Q3) may have a roughness value which can be referred to as rough. In the quadrant Q1, the surface region 12 which is directed toward the counter-pressure side 9 may have a lower roughness which can be referred to as smooth. The surface regions 13 and 14 in the quadrant Q1 and Q4 may also have a lower roughness which can be referred to as very smooth.

At the line H3, that is to say, in the central region 18, the surface region 11 which is directed toward the pressure side 8 (quadrant Q3) may have a roughness value which can be referred to as smooth. In the quadrant Q1, the surface region 12 which is directed toward the counter-pressure side 9 may have a lower roughness which can be referred to as very smooth. The surface regions 13 and 14 in the quadrant Q1 and Q4 may have a roughness which can be referred to as very smooth.

At the line H4, that is to say, in the lower transition region 19, the surface region 11 which is directed toward the pressure side 8 (quadrant Q3) may have a roughness value which can be referred to as smooth. In the quadrant Q1, the surface region 12 which is directed toward the counter-pressure side 9 may have a lower roughness which can be referred to as very smooth. The surface regions 13 and 14 in the quadrant Q1 and Q4 may have a roughness which can be referred to as very smooth.

At the line H5, that is to say, in the bottom dead center region 21, the surface region 11 which is directed toward the pressure side 8 (quadrant Q3) may have a roughness value which can be referred to as rough. In the quadrant Q1, the surface region 12, which is directed toward the counter-pressure side 9, may have a lower roughness which can be referred to as smooth. The surface regions 13 and 14 in the quadrants Q1 and Q4 may have a roughness which can be referred to as very smooth.

In the quadrants Q2 and Q4, the respective surface region may have in the five portions 16 to 21 a substantially identical roughness which can be referred to as very smooth. In the central region 18 and in the lower transition region 19, the surface regions 11 which may be orientated toward the pressure side 8 may have substantially identical roughnesses which can be referred to as smooth. In comparison, the surface regions 12 which may be orientated toward the pressure side 9 may have identical roughnesses which can, however, be referred to as very smooth.

Thus, the bore surface 2 may have variable roughness values in the vertical direction and in a peripheral direction.

Various embodiments may provide a cylinder bore 1 configured to receive a piston 3 for reciprocating movement therein and having a pressure side 8 and a counter-pressure side 9. The cylinder bore 1 may include a bore surface 2 having a first roughness value in a first longitudinal region, for example the TDC region 16, on the pressure side 8 and a second roughness value different from the first roughness value in the first longitudinal region on the counter-pressure side 9. The first roughness value may be greater than the second roughness value.

A selected roughness value of the bore surface on the pressure side 8 may be different from another selected roughness value on the counter-pressure side 9 in two or more other longitudinal regions, for example the upper transition region 16 and the central region 17. The roughness value in a top dead center region 16 may be greater than in a bottom dead center region 21 on the pressure side 8.

Some example embodiments provide a cylinder bore wherein the roughness value in a top dead center region 16 may be greater than in a bottom dead center region 21 on the counter-pressure side 9. In some cases the bore surface 2 may have intermediate sectors 13, 14 arranged vertically along the cylinder bore 1 and located peripherally between a pressure side sector 11 and a counter-pressure side sector 12. The roughness values may be lower than in the pressure side and counter-pressure side sectors 11, 12.

The bore surface 2 may be divided into longitudinally successive regions 16, 17, 18, 19, 21 wherein within each region the roughness may be different on the pressure side 8 from the roughness on the counter-pressure side 9. The bore surface 2 may include a top dead center region 16 wherein the roughness is greater on the pressure side 8 than the roughness on the counter-pressure side 9. The bore surface 2 may include an upper transition region 17 located adjacent a top dead center region 16 wherein the roughness value on the pressure side 8 may be greater than the roughness value on the counter-pressure side 9. The bore surface 2 may include a central region 18 located adjacent the upper transition region 17 and substantially midway between the top dead center region 16 and a bottom dead center region 21, wherein the roughness may be greater on the pressure side 8 than on the counter-pressure side 9. The bore surface 2 may include a lower transition region 19 located adjacent a bottom dead center region 21, wherein the roughness may be greater on the pressure side 8 than on the counter-pressure side 9. The bore surface 2 may include a bottom dead center region 21, wherein the roughness may be greater on the pressure side 8 than on the counter-pressure side 9.

Figure 7:
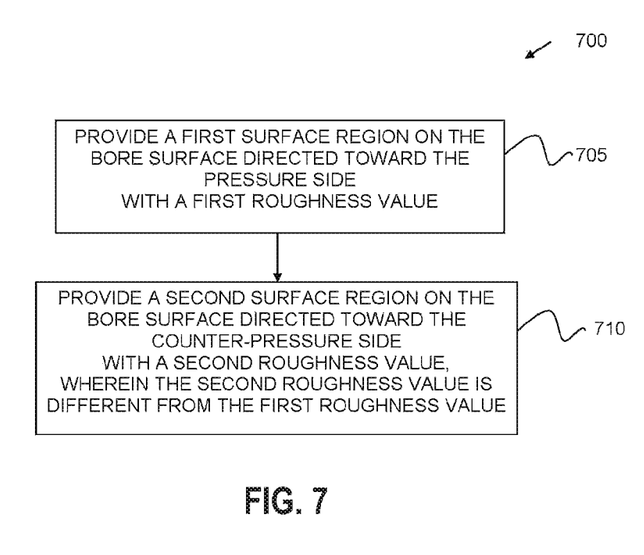
FIG. 7 is a flow diagram illustrating an example method 700 in accordance with the disclosure.

FIG. 7 is a flow diagram illustrating an example method 700 in accordance with the disclosure. Various embodiments may provide a method 700 for producing a cylinder bore 1. The cylinder bore 1 may have a bore surface 2. A piston 3 may be moveable alternately back and forth within the cylinder bore 1, and the piston 3 may have a pressure side 8 and a counter-pressure side 9. The method may include, at 705, providing a first surface region on the bore surface 2 directed toward the pressure side 8 with a first roughness value; and, at 710, providing a second surface region on the bore surface directed toward the counter-pressure side 9 with a second roughness value, wherein the second roughness value is different from the first roughness value.

Figure 8:
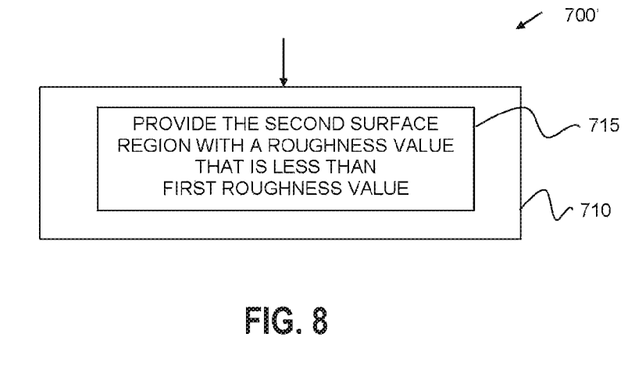
FIG. 8 is a flow diagram illustrating another example method 700' in accordance with the disclosure.

FIG. 8 is a flow diagram illustrating another example method 700' in accordance with the disclosure, and may be considered a variation of the method 700 illustrated in FIG. 7. FIG. 8 illustrates that, in some cases, the providing a second surface region on the bore surface 2 shown at 710 in FIG. 7 may be to, at 715, provide the second surface region with a roughness value that is less than first roughness value.

Figure 9:
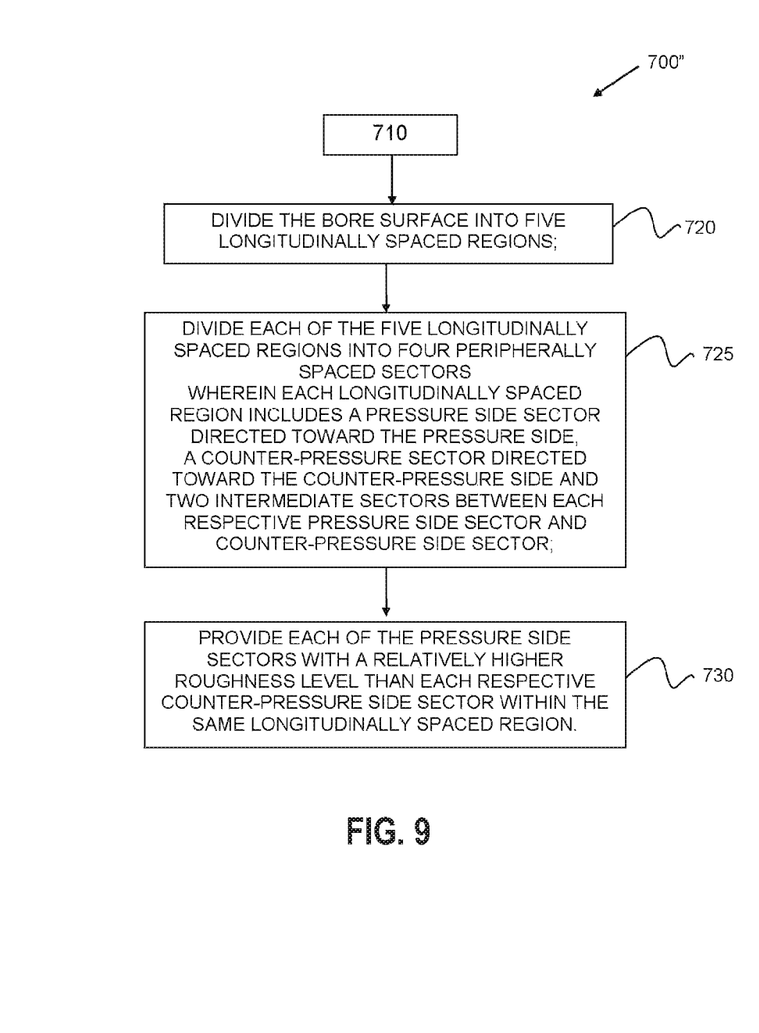
FIG. 9 is a flow diagram illustrating another example method 700" in accordance with the disclosure.

FIG. 9 is a flow diagram illustrating another example method 700" in accordance with the disclosure, and may include the operations illustrated in FIG. 7. The method 700" may also include, at 720, dividing the bore surface 2 into five longitudinally spaced regions 16, 17, 18, 19, 21, and, at 725, dividing each of the five longitudinally spaced regions 16, 17, 18, 19, 21 into four peripherally spaced sectors 11, 12, 13, 14. Each longitudinally spaced region 16, 17, 18, 19, 21 may include a pressure side sector 11 directed toward the pressure side 8, a counter-pressure sector 12 directed toward the counter-pressure side 9 and two intermediate sectors 13, 14 between each respective pressure side sector 11 and counter-pressure side sector 12. The method 700" may also include, at 730, providing each of the pressure side sectors 11 with a relatively higher roughness level than each respective counter-pressure side sector 12 within the same longitudinally spaced region 16, 17, 18, 19, 21.

Embodiments may provide a cylinder 1 for an internal combustion engine that may include three or more longitudinally spaced regions 16, 17, 18, 19, 21. Each longitudinally spaced regions 16, 17, 18, 19, 21 may be separated into two or more peripherally spaced sectors 11, 12, 13, 14 including a pressure side sector 11 and a counter-pressure side sector 12. A relatively topmost pressure side sector 11 (on 16) may have a first roughness value, and a relatively topmost counter-pressure side sector 12 (on 16) may have a second roughness value different than the first roughness value. The first roughness value may be greater than the second roughness value.

Each of the three or more longitudinally spaced regions 16, 17, 18, 19, 21 may include two intermediate sectors 13, 14 located between and dividing the pressure side sector 11 from the counter-pressure side 12 sector having a roughness value less that the first and second roughness values. The pressure side sector 11, the counter-pressure side sector 12 and the two intermediate sectors 13, 14 may divide each of the three or more longitudinally spaced regions 16, 17, 18, 19, 21 into substantially equal sized quadrants.

Embodiments may provide a cylinder wherein the three or more longitudinally spaced regions may include five longitudinally spaced regions 16, 17, 18, 19, 21. The five longitudinally spaced regions 16, 17, 18, 19, 21 may include a top dead center region 16, an upper transition region 17, a central region 18, a lower transition region 19, and a bottom dead center sector 21. Each of the five longitudinally spaced regions 16, 17, 18, 19, 21 may include four peripherally spaced sectors 11, 12, 13, 14 including a pressure side sector 11, a counter-pressure side sector 12, and two intermediate sectors 13, 14 between the pressure side and counter-pressure side sectors 11, 12. The pressure side sector 11 in the top dead center region 16 may be formed to have greatest roughness value of all the sectors. The intermediate sectors 13, 14 in all the regions 16, 17, 18, 19, 21 may be at least among the regions formed to have the lowest roughness value of all the sectors. The remaining pressure side sectors 11 and the counter-pressure side sectors 12 in the top and bottom dead center region 16 may be formed to have one or more roughness values between the greatest roughness value and the lowest roughness value.

Note that the example control and estimation routines included herein can be used with various engine and/or vehicle system configurations. Selected actions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A cylinder bore configured to receive a piston for reciprocating movement therein and having a pressure side and a counter-pressure side, comprising:
   a bore surface having a first roughness value in a first longitudinal region on the pressure side and a second roughness value in a second longitudinal region different from the first roughness value in the first longitudinal region on the counter-pressure side, wherein a selected roughness value of the bore surface on the pressure side is different from another selected roughness value on the counter-pressure side in two or more other longitudinal regions other than the first and second regions.

2. The cylinder bore according to claim 1, wherein the first roughness value is greater than the second roughness value.

3. The cylinder bore according to claim 1, wherein a roughness value in a top dead center region is greater than in a bottom dead center region on the pressure side.

4. The cylinder bore according to claim 1, wherein a roughness value in a top dead center region is greater than in a bottom dead center region on the counter-pressure side.

5. The cylinder bore according to claim 1, wherein the bore surface is divided into longitudinally successive regions, wherein within each region the roughness is different on the pressure side from the roughness on the counter-pressure side.

6. The cylinder bore according to claim 1, wherein the bore surface includes a lower transition region located adjacent a bottom dead center region, wherein the roughness is greater on the pressure side than on the counter-pressure side.

7. The cylinder bore according to claim 1, wherein the bore surface includes a bottom dead center region, wherein the roughness is greater on the pressure side than on the counter-pressure side.

8. A cylinder bore configured to receive a piston for reciprocating movement therein and having a pressure side and a counter-pressure side, comprising:
   a bore surface having a first roughness value in a first longitudinal region on the pressure side and a second roughness value in a second longitudinal region different from the first roughness value in the first longitudinal region on the counter-pressure side, wherein the bore surface has intermediate sectors arranged vertically along the cylinder bore and located peripherally between a pressure side sector and a counter-pressure side sector wherein the roughness values are lower than in the pressure side and counter-pressure side sectors.

9. A cylinder bore configured to receive a piston for reciprocating movement therein and having a pressure side and a counter-pressure side, comprising:
   a bore surface having a first roughness value in a first longitudinal region on the pressure side and a second roughness value in a second longitudinal region different from the first roughness value in the first longitudinal region on the counter-pressure side, wherein the bore surface includes a top dead center region wherein a roughness is greater on the pressure side than a roughness on the counter-pressure side.

10. A cylinder bore configured to receive a piston for reciprocating movement therein and having a pressure side and a counter-pressure side, comprising:
   a bore surface having a first roughness value in a first longitudinal region on the pressure side and a second roughness value in a second longitudinal region different from the first roughness value in the first longitudinal region on the counter-pressure side, wherein the bore surface includes an upper transition region located adjacent a top dead center region wherein a roughness value on the pressure side is greater than a roughness value on the counter-pressure side.

11. The cylinder bore according to claim 10, wherein the bore surface includes a central region located adjacent the upper transition region and substantially midway between the top dead center region and a bottom dead center region, wherein the roughness is greater on the pressure side than on the counter-pressure side.

12. A cylinder for an internal combustion engine comprising:
   three or more longitudinally spaced regions each separated into two or more peripherally spaced sectors including a pressure side sector and a counter-pressure side sector;
   a relatively topmost pressure side sector having a first roughness value; and
   a relatively topmost counter-pressure side sector having a second roughness value different than the first roughness value, wherein the first roughness value is greater than the second roughness value, wherein each of the three or more longitudinally spaced regions include two intermediate sectors located between and dividing the pressure side sector from the counter-pressure side sector having a roughness value less that the first and second roughness values.

13. The cylinder of claim 12, wherein the pressure side sector, the counter-pressure side sector and the two intermediate sectors divide each of the three or more longitudinally spaced regions into substantially equal sized quadrants.

14. The cylinder of claim 12, wherein the three or more longitudinally spaced regions include five longitudinally spaced regions including:
   a top dead center region,
   an upper transition region,
   a central region,
   a lower transition region,
   a bottom dead center region,
   wherein each of the five longitudinally spaced regions include four peripherally spaced sectors including a pressure side sector, a counter-pressure side sector, and two intermediate sectors between the pressure side and counter-pressure side sectors; and
   wherein:
   the pressure side sector in the top dead center region is formed to have a greatest roughness value of all the sectors;
   the intermediate sectors in all the regions are at least among the regions formed to have a lowest roughness value of all the sectors; and
   the remaining pressure side sectors and the counter-pressure side sectors in the top and bottom dead center regions are formed to have one or more roughness values between the greatest roughness value and the lowest roughness value.

* * * * *